United States Patent [19]

Hebert et al.

[11] Patent Number: 6,055,237
[45] Date of Patent: *Apr. 25, 2000

[54] TELECOMMUNICATIONS SWITCHING SYSTEM WITH READILY CONFIGURABLE SUPERVISORY CONTROL

[75] Inventors: Mark P. Hebert, Kingston; Peter Higgins, Sandwich, both of Mass.

[73] Assignee: Excel Switching Corporation, Hyannis, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/811,083

[22] Filed: Mar. 3, 1997

[51] Int. Cl.[7] .............................. H04L 12/56; H04L 12/66
[52] U.S. Cl. ......................... 370/396; 370/401; 370/409
[58] Field of Search .................................... 370/254, 351, 370/389, 396, 400, 401, 402, 403, 409, 410; 714/1, 2, 3, 4

[56] References Cited

U.S. PATENT DOCUMENTS

| | | | |
|---|---|---|---|
| 5,220,562 | 6/1993 | Takada et al. | 370/409 |
| 5,317,562 | 5/1994 | Nardin et al. | 370/428 |
| 5,440,547 | 8/1995 | Esaki et al. | 370/397 |
| 5,461,608 | 10/1995 | Yoshiyama | 370/455 |
| 5,621,734 | 4/1997 | Mann et al. | 370/409 |

*Primary Examiner*—Alpus H. Hsu
*Attorney, Agent, or Firm*—Cesari and McKenna

[57] ABSTRACT

A telephone switching system comprises a plurality of switching nodes interconnected by a call-switching network. The switching nodes are also linked by a host network to one or more hosts that exercise supervisory control over the nodes. The hosts communicate directly with one or more of the nodes, termed "switching nodes", by means of virtual connections over the host network. The other switching nodes, termed "slave nodes", are assigned to host nodes. The hosts communicate indirectly with the slave nodes by way of switching nodes to which they are assigned. Communications between a host and a slave node thus comprise messages (a) over the host network between the slave node and the switching node to which the slave node is assigned and (b) by way of a virtual connection between the switching node and the host.

8 Claims, 7 Drawing Sheets

TELECOMMUNICATIONS SWITCHING SYSTEM WITH READILY CONFIGURABLE SUPERVISORY CONTROL

TECHNICAL FIELD

This invention relates to a telecommunications switching system and specifically to the supervision of various elements in the system. More particularly the invention relates to host computers that provide overall control and monitoring of the switching functions in systems in which a plurality of switching nodes are interconnected by an internodal network.

BACKGROUND OF THE INVENTION

An example of a switching system to which the present invention applies is described in U.S. Pat. No. 5,544,163, Expandable Telecommunications System, the contents of which are hereby incorporated by reference herein. In that system a host computer exercises overall control of the system. Specifically, it exercises control of a plurality of switching nodes that are interconnected by an internodal network For example, it performs call setup and teardown functions by supervising virtual connections among the line interface ports in the switching nodes incorporated in the system. The host also performs various system monitoring functions and it is used in configuring and reconfiguring the system in response to inputs from a system operator. These various functions are described in the above-referenced patent. Communications between the host and the switching nodes are preferably provided by a host network, i.e., a network other than the internodal network which is used in the telecommunications switching function of the switching system.

A single system host was originally contemplated. However, in some environments the host may be overloaded, for example, by a high frequency of call setup and teardown operations and by other functions that may be assigned by the system operator. Moreover various nodes or groups of nodes may be situated in widely separated geographic locations and communications between a single host and all of the switching nodes may be substantially more expensive than distribution of the host functions on a geo-graphic basis. Moreover, the system operator may desire more flexibility in the communication cation of host functions than is available in the prior single-host arrangements.

SUMMARY OF THE INVENTION

In accordance with the invention, one or more hosts communicate directly with designated switching nodes, termed "host nodes" by means of virtual circuits, preferably using an existing protocol such as TCP (Transmission Control Protocol). The other switching nodes, termed "slave nodes," communicate with the host by way of the host nodes. The same communications link, e.g. an Ethernet link, that is used in the prior hostswitching node communications, is used here. That is, this link is used both between the host nodes and the slave nodes and between the hosts and the host nodes. However, the host-host node circuits are the only connections between the hosts and the switching nodes for supervisory functions, although there are physical connections between each of the hosts and all of the nodes by virtue of the underlying host network.

This arrangement provides complete flexibility for the system operator. The system can be operated as in previous configurations in which a single host communicates directly with each of the switching nodes, by establishing separate TCP socket connections between the host and each of the nodes and thus making each of the nodes a host node. Alternatively, a single host can establish socket connections with only some of the nodes, which then become host nodes and the host can further establish host-slave relationships between those nodes and the other switching nodes in the system. Communications between the host and one of the slave nodes will then take place by means of (1) the socket connection between the host and the corresponding host node and (2) between the host node and the slave node by means of the previously used communications protocol over the host network that interconnects all of the hosts and nodes.

Further, where the system operator decides to use multiple hosts, for example, because a single host cannot process all of the host functions or because of geographical separation of the various nodes in the system, the system can be configured with hosts having TCP socket connections with different host nodes. The system operator can then decide how to divide the host functions among the respective hosts.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
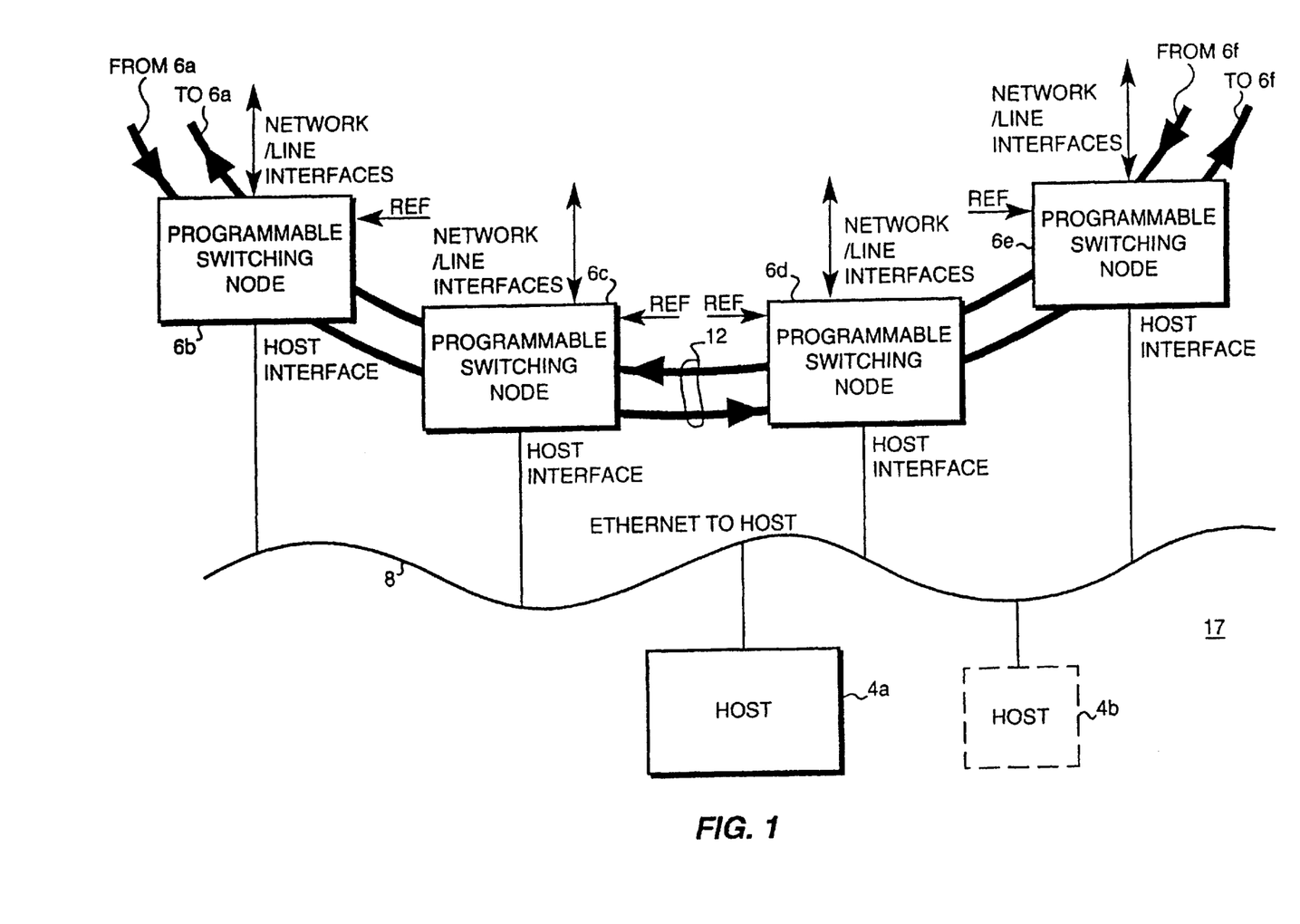
FIG. 1 is a fragmentary diagram of a switching system to which the present invention may be applied.

As shown in FIG. 1 a typical switching system to which the invention applies comprises a plurality of switching nodes 6b–6e connected in a ring-like network 12. For "call" switching each of the nodes thus communicates directly with its neighbors in the ring, with messages destined for other nodes passing through successive nodes to the destination nodes. Thus the node 6b is connected directly to a node 6a (not shown) and the node 6e is directly connected to a node 6f (not shown). Each of the switching nodes is associated with a plurality of network/line interfaces which provide connections between the switching system and subscribers' lines, for example, and also with other switching systems such as the PSTN. Moreover, one of the switching nodes can serve as a bridge to a switching system similar to the one depicted in FIG. 1, an example of the latter arrangement being described in the above-referenced U.S. Pat. No. 5,544, 163.

Overall supervision, i.e. control and monitoring of the switching functions of the network 12 is provided by a host computer 4a (host) that is linked to the switching nodes by a host network 8 which, in the illustrated example, is an Ethernet network. In accordance with the present invention, further hosts such as the host 4b may also be connected to the network 8 so as to exercise supervisory functions. To accomplish this, each of the hosts (e.g., 4a and 4b) establishes virtual connections with one or more switching nodes over the network 8.

Figure 2:
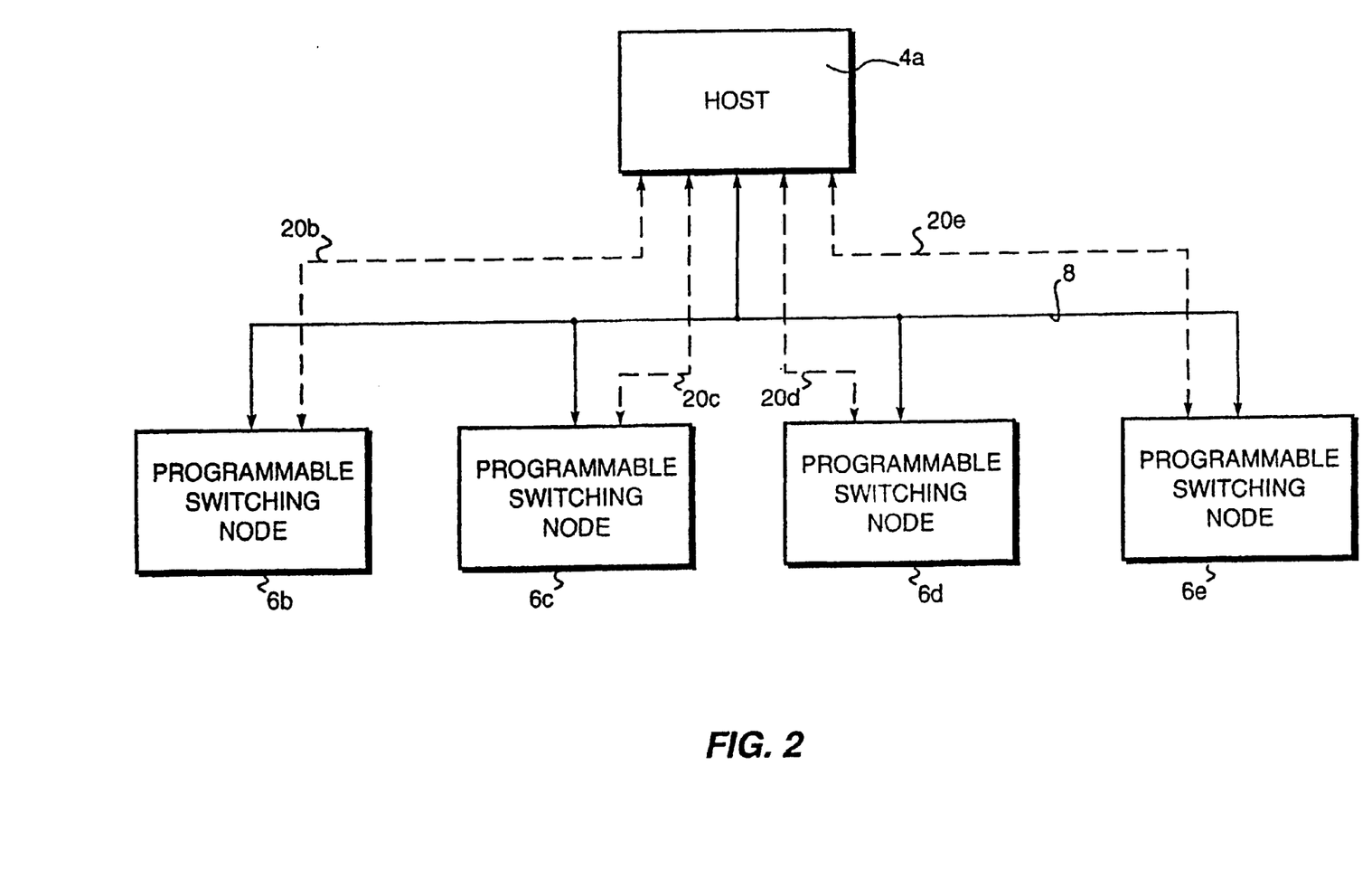
FIG. 2 is a diagram of a single-host system configured in accordance with the present invention.

More specifically, FIG. 2 illustrates single-host arrangement incorporating the invention. A single host 4a is connected to switching nodes 6b–6e by the network 8 as in FIG. 1. The host 4a has also established virtual circuit connections 20b–20e over the network 8 to the individual switching nodes. These virtual connections are preferably TCP socket connections and they establish all four of the switching nodes as host nodes. The host 4a thus communicates directly with each of the switching nodes for the various supervisory functions.

Figure 3:
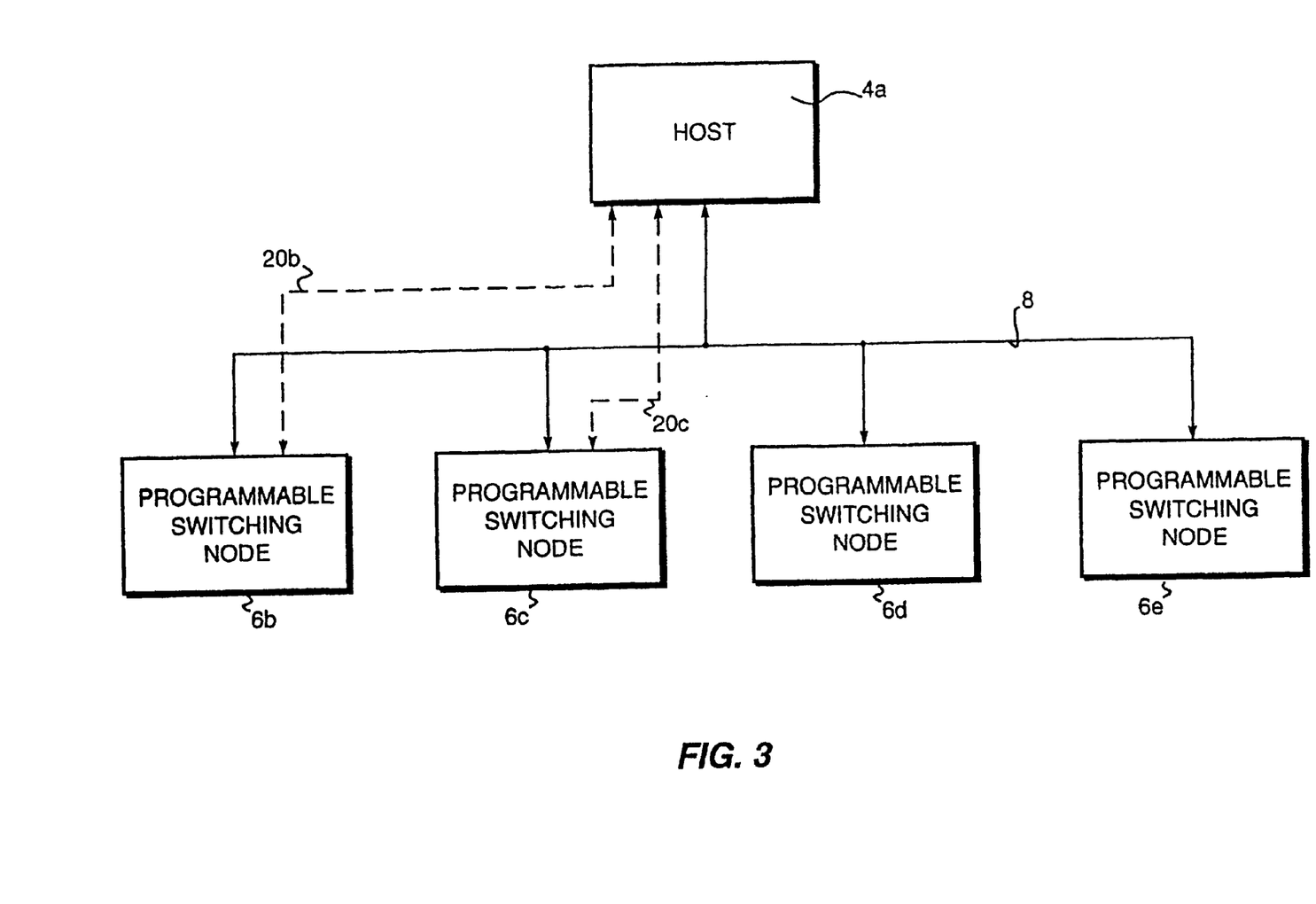
FIG. 3 is a diagram of another single-host configuration.

FIG. 3 illustrates a variation of a single-host system in which the host 4a has established only the virtual connections 20b and 20c to switching nodes 6b and 6c, respectively. These nodes are thus host nodes. The nodes 6d and 6e, which do not have virtual connections to the host 4a, are slave nodes, and all supervisory communications between the slave nodes and the host 4a are made through the host nodes 6b and 6c. Specifically, each of the slave nodes is assigned to a host node for host communications. For example, the node 6d might be a slave node associated with host node 6b and node 6e might be a slave node associated with host node 6c.

Figure 4:
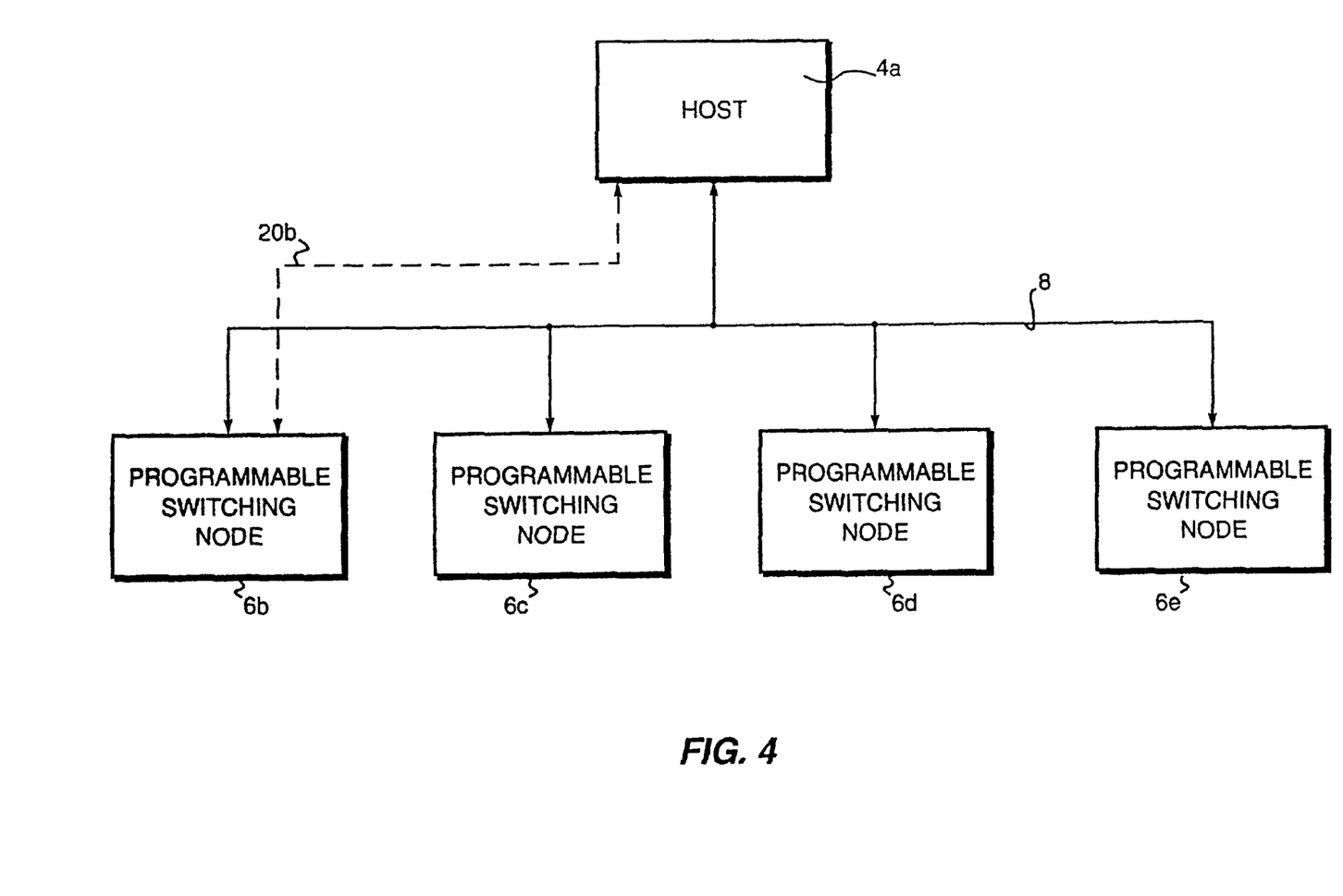
FIG. 4 is a diagram of a further single-host configuration.

FIG. 4 illustrates a further variation of a single-host system. In this case, the host 4a is connected in a single virtual circuit 20b to the node 6b. Nodes 6c, 6d and 6e are thus slave nodes, all of whose supervisory communications with the host take place by way of the host node 6b.

Figure 5:
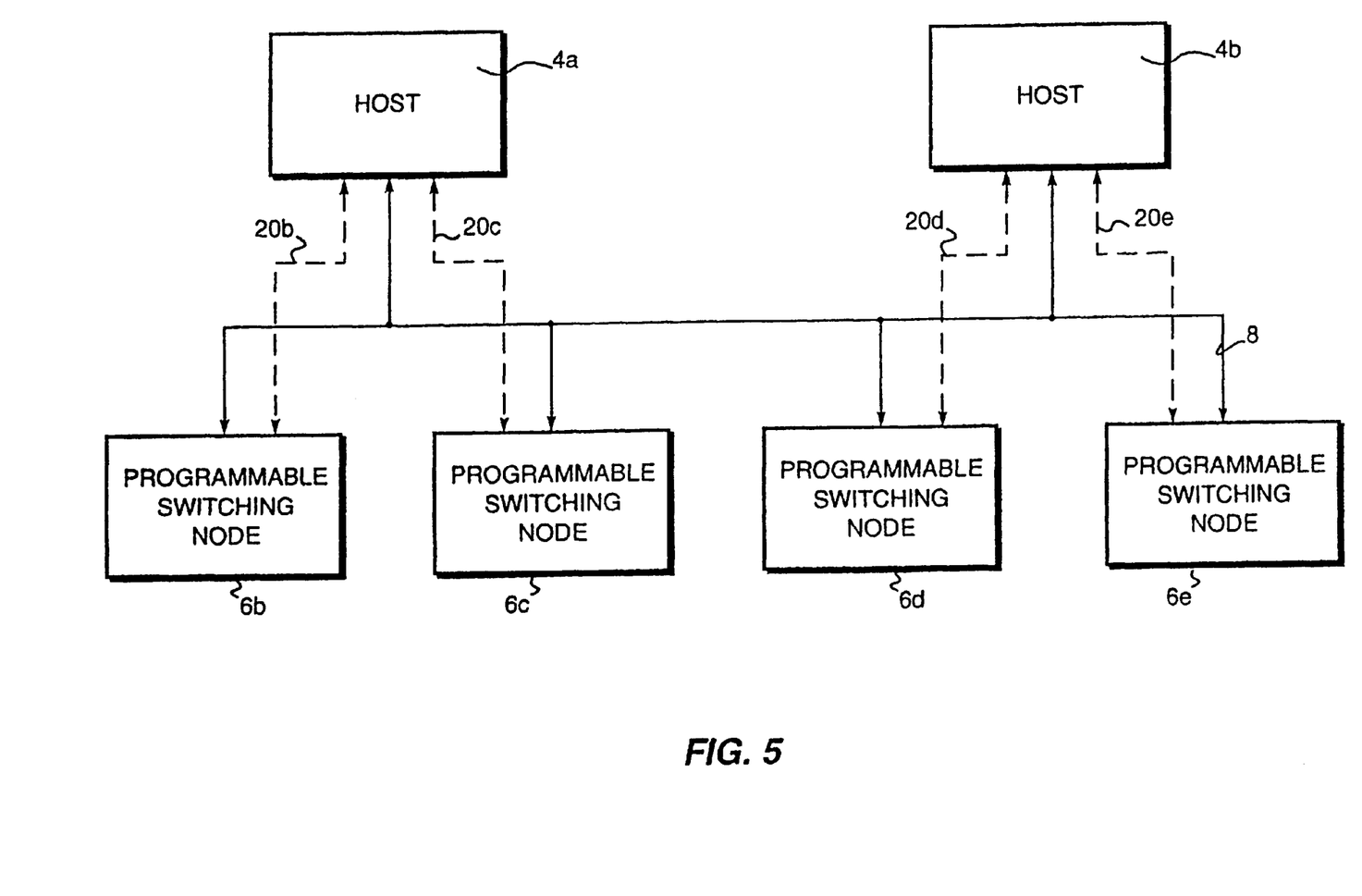
FIG. 5 is a diagram of a multiple host configuration.

As shown in FIG. 5, a two-host system may comprise hosts 4a and 4b, which control and monitor different switching nodes in the system. The host 4a is connected in virtual circuits 20b and 20c with nodes 6b and 6c and the host 4b is connected in virtual circuits $20_d$ and $20_e$ with nodes 6d and 6e respectively. The hosts 4a and 4b thus supervise the switching operations of different sets of switching nodes. In setting up and tearing down calls between the two sets of nodes, e.g. between node 6c and node 6d, each of the hosts performs its usual functions and, in addition, communicates with the other host over the network 8 to perform this function. The manner in which this is arranged is up to the system operator and for the purposes of this invention, the latter term includes an applications programmer who assigns various functions to each of the hosts.

Figure 6:
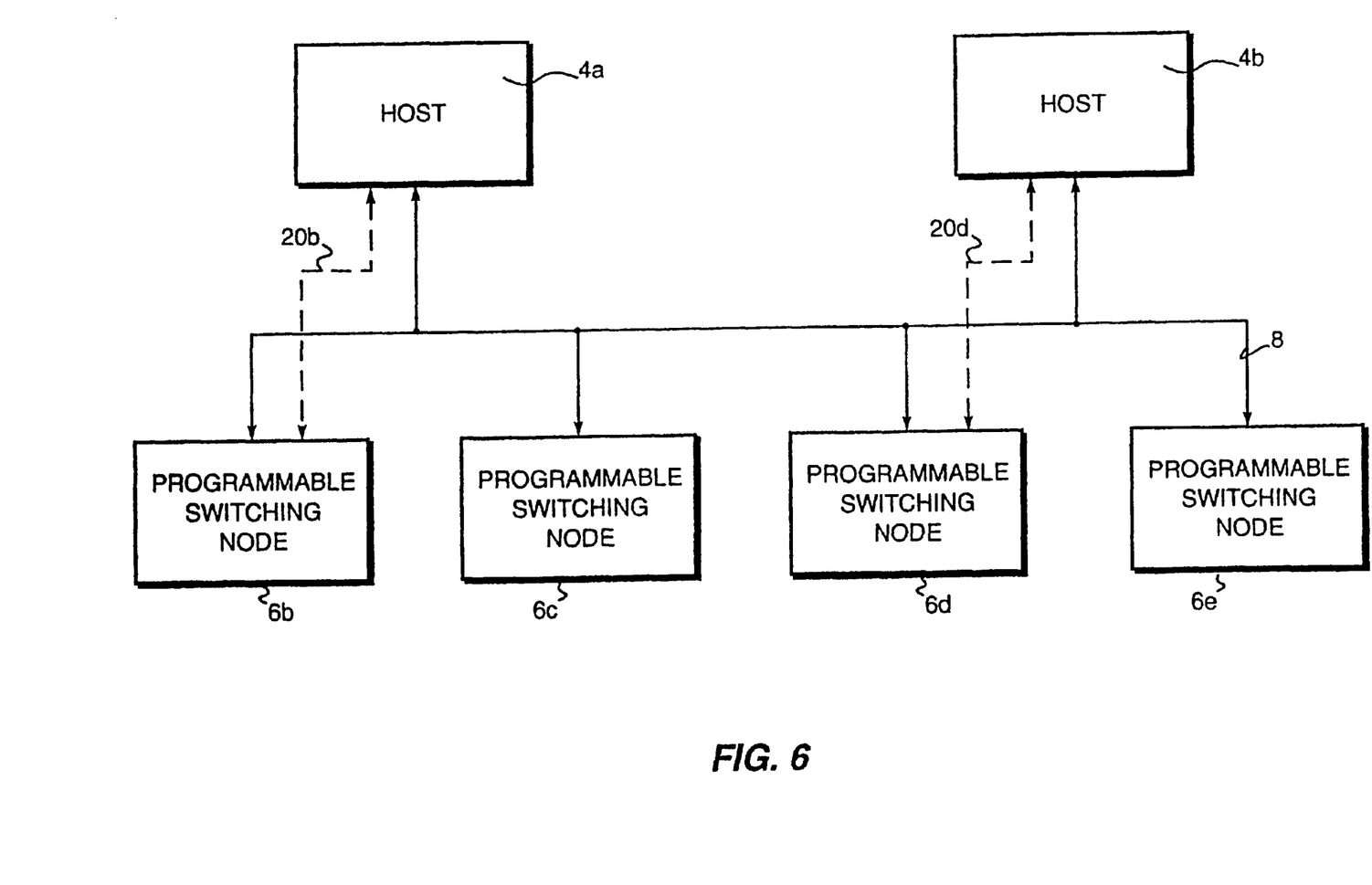
FIG. 6 is a diagram of a further multiple-host configuration.

In FIG. 6 we have illustrated another two-host configuration. Here the host 4a is again assigned to nodes 6b and 6c and has established a virtual circuit connection 20b with the 6b node, the node 6c being a slave node which communicates with the host 4a by way of the host node 6b. Similarly, the host 4b has established a virtual circuit connection 20d with host node 6d and connections between the host 4a and node 6e are effected by way of the host 6d.

Figure 7:
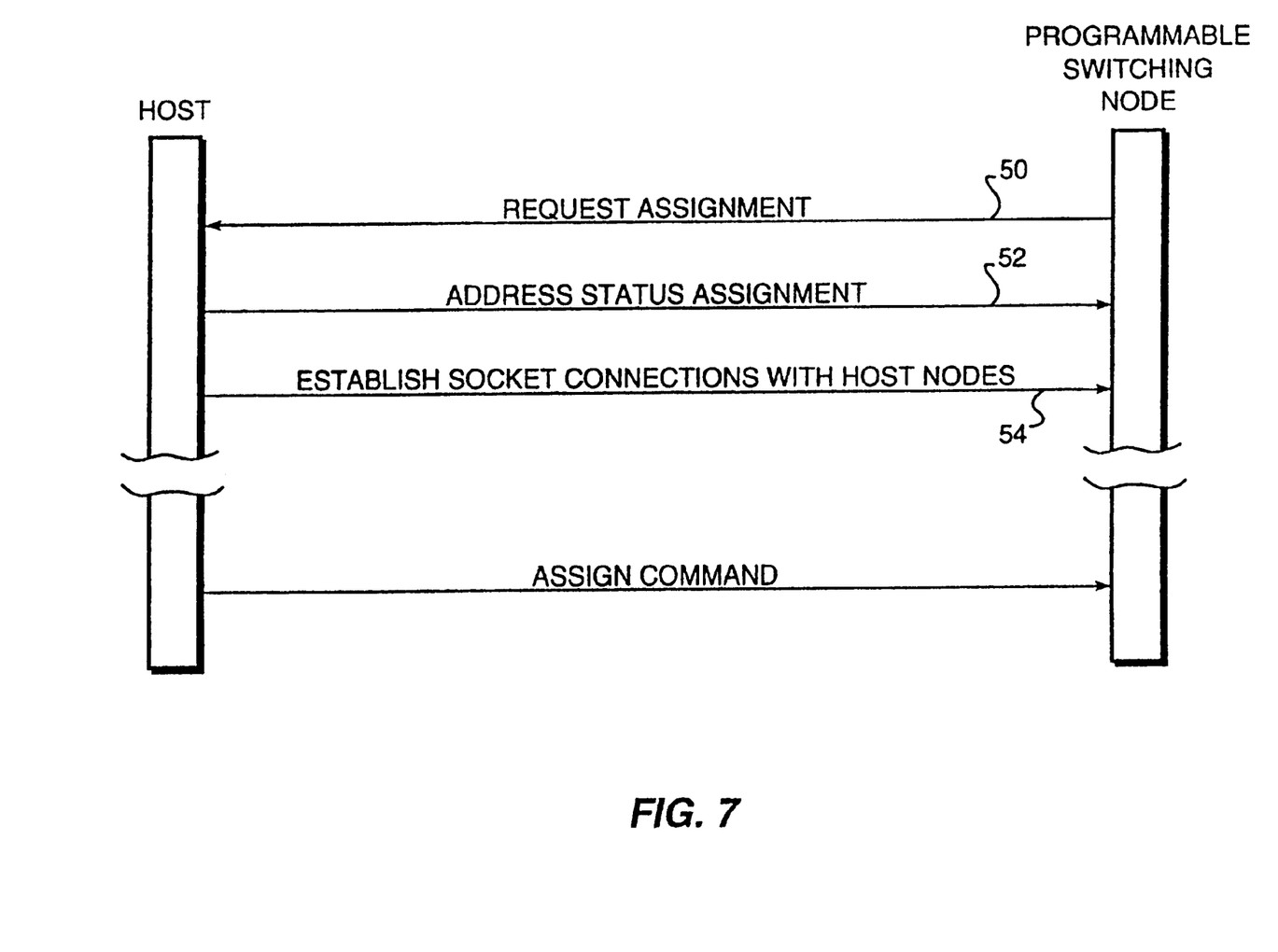
FIG. 7 is a diagram of communications used in configuring a supervisory arrangement incorporating the invention.

The manner in which the host-switching node configuration is established is as follows. Each switching node is manufactured with a unique identification number which is contained in a permanent register therein. When the system is initialized, e.g. at startup, each of the switching nodes broadcasts a message over the host-node network 8, containing its identification number as indicated by the message 50 in FIG. 7. The system operator has loaded each host with a list of the switching nodes that are assigned to that host. The appropriate host therefore responds with a broadcast message 52, assigning a network address to the requesting node and further assigning its status, i.e. as a host node or as a slave node. If it is a slave node, the message also includes the network address of the corresponding host node. Each of the host nodes also establishes socket connections with its host nodes with assignment manager, as indicated at 54, each of these messages including the network addresses of the slave nodes that will communicate with the host node through each of the socket connections.

At any time after initialization, the configuration can easily be changed. This is accomplished by transmission of an assignment command from the pertinent host to a host node specifying a slave node to be associated with the host node. The host node then transmits a corresponding message to the slave node identified in the assigned command. Each switching node, upon receiving a message from another switching node "assumes" that thenceforward it is associated with the latter node in a host-slave relationship. If it was previously assigned to a different host node it transmits a message to the latter node indicating its change of status. It will be apparent that this arrangement can be used to set up new host nodes or otherwise change the host-slave node configuration in the system.

All of the foregoing messages are transmitted as conventional network messages over the network 8. For example, if the network is configured according to Ethernet standards, the messages are transmitted in accordance with that standard. Any appropriate message protocol can be used. However, we prefer to use the arrangement described in U.S. Pat. No. 5,426,694, which is incorporated herein by reference for development of the message protocol.

On the other hand, the call supervision function of the network is effected by means of communications over the virtual circuits established between the hosts and the respective host nodes. Assuming that TCP is the protocol used, the hosts set up the socket connections with the host nodes in accordance with well-known procedures. The messages between the host nodes and the slave nodes are transmitted over the network 8 in the same manner as the setup messages, that is, as set forth in U.S. Pat. No. 5,544,163 for host-node messages.

It will be apparent that the invention provides for highly flexible control of a switching network, that is, it facilitates configuration and modification of the supervisory function by the system operator. Specifically, it facilitates adaptation of this supervisory configuration according to network traffic, geographic locations and other relevant factors.

What is claimed is:

1. A communications network comprising:
   A. a plurality of switching nodes;
   B. at least one host;
   C. an internal network interconnecting said switching nodes for conveying switched telecommunications data between them;
   D. a host network physically lining each host and said switching nodes;
   E. for each host a virtual connection on said host network, said virtual connection linking the host and at least one of said switching nodes, each switching node linked to a host node by a virtual connection being a host node and all other switching nodes being slave nodes; and wherein
   F. each slave node is associated with a host node;
   G. each host supervising the switching functions of
      (1) each host node linked thereto by a virtual connection and
      (2) each slave node associated with that host node, and
   H. all supervisory communications between a host and a slave node relating to telecommunications switch operations are effected through (1) the virtual connection between the host and the host node associated with that slave node, and
(2) a message, over the host network, between the host node and the slave node.

2. The system defined in claim 1:
   A. including multiple hosts;
   B. in which each of said hosts supervises and monitors a different set of said switching nodes; and
   C. including a virtual connection between each host and at least one of the nodes in the set of nodes supervised and/or monitored by the host.

3. The system defined in claim 2 including a virtual circuit over said host network between each of said hosts and at least one of the switching nodes supervised and/or monitored by that host.

4. A method of communicating between hosts and switching nodes in a communications network that includes:
   A. a plurality of switching nodes;
   B. at least one host;
   C. an internal network interconnecting the switching nodes and for conveying switched telecommunications data between them; and
   D. a host network physically linking said hosts and said switching nodes, said method comprising the steps of:
   E. for each host establishing a virtual connection on said host network, said virtual connection linking the host and at least one of said switching nodes, each switching node linked to a host node by a virtual connection being a host node and all other switching nodes being slave nodes;
   F. associating each slave node with a host node;
   G. establishing supervisory functions for each host, over
      (1) each host node linked thereto by a virtual connection, and
      (2) each slave node associated with that host node; and
   H. effecting all supervisory communications between a host and a slave node through
      (1) the virtual connection between the host and the host node associated with that slave node, and
      (2) messages, over the host network, between the host node and the slave node.

5. The method defined in claim 4 including the steps of:
   A. initially loading each host with a list of the switching nodes supervised by that host and which of these switching nodes are host nodes,
   B. broadcasting over the host network by each switching node a message containing an identification number of the node,
   C. communicating from each host to each of the switching nodes supervised by that host,
      1. a network address for that node,
      2. the status of the switching node as either a host node or a slave node, and
      3. if it is a slave node, the network address of the corresponding host node.

6. The method define in claim 5 including the steps of changing the configuration of the host network, said steps including
   A. transmitting a message from a host to a host node specifying a slave node to be associated with that host node;
   B. transmitting a message to the identified slave node informing the slave node of the assignment to the host node, and
   C. if the slave node was previously assigned to a different host node transmitting a message from the slave node to the latter host node indicating the change of status.

7. A communications network comprising:
   A. A plurality of switching nodes;
   B. at least one host;
   C. an internal network interconnecting said switching nodes for conveying switched telecommunications data between them;
   D. a host network physically linking each host and said switching nodes;
   E. virtual connections on said host network linking at least one host and a plurality of said switching nodes, each switching node linked to a host node by a virtual connection being a host node and all other switching nodes being slave nodes; and wherein
   F. each slave node is associated with a host node;
   G. each host supervises the switching functions of
      (1) each host node linked thereto by a virtual connection and
      (2) each slave node associated with that host node, and
   H. all supervisory communications between a host and a slave node relating to telecommunications switch operations are effected through
      (1) the virtual circuit connection between the host and the host node associated with that slave node, and
      (2) a message, over the host network, between the host node and the slave node.

8. A method of communicating between hosts and switching nodes in a communications network that includes.
   A. a plurality of switching nodes;
   B. at least one host;
   C. an internal network interconnecting the switching nodes and for conveying switched telecommunications data between them; and
   D. a host network physically linking said hosts and said switching nodes, said method comprising the steps of;
   E. establishing virtual connections on said host network, linking the host and a plurality of said switching nodes, each switching node linked to a host node by a virtual connection being a host node and all other switching nodes being slave nodes;
   F. associating each slave node with a host node;
   G. establishing supervisory functions for each host, over
      (1) each host node linked thereto by a virtual connection, and
      (2) each slave node associated with that host node; and
   H. effecting all supervisory communications between a host and a slave node through
      (1) the virtual connection between the host and the host node associated with that slave node, and
      (2) messages, over the host network, between the host node and the slave node.

* * * * *